United States Patent
DeAlessio et al.

(10) Patent No.: US 12,253,009 B1
(45) Date of Patent: Mar. 18, 2025

(54) INSTRUMENTED STATOR WITH EXTENDED INTERNAL PASSAGES

(71) Applicant: RTX Corporation, Farmington, CT (US)

(72) Inventors: Bryce T. DeAlessio, Plainville, CT (US); Joon Won Ha, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/467,846

(22) Filed: Sep. 15, 2023

(51) Int. Cl.
| F01D 1/00 | (2006.01) |
| B33Y 10/00 | (2015.01) |
| B33Y 80/00 | (2015.01) |
| F01D 9/04 | (2006.01) |
| F01D 9/06 | (2006.01) |
| F01D 25/24 | (2006.01) |

(52) U.S. Cl.
CPC .............. *F01D 9/041* (2013.01); *B33Y 10/00* (2014.12); *B33Y 80/00* (2014.12); *F01D 9/042* (2013.01); *F01D 9/06* (2013.01); *F01D 9/065* (2013.01); *F01D 25/246* (2013.01); *F05D 2230/60* (2013.01); *F05D 2240/10* (2013.01); *F05D 2240/55* (2013.01); *F05D 2240/80* (2013.01)

(58) Field of Classification Search
CPC ........ F01D 9/041; F01D 25/246; F01D 9/042; F01D 9/06; F01D 9/065; B33Y 10/00; B33Y 80/00; F05D 2230/60; F05D 2240/10; F05D 2240/55; F05D 2240/80
See application file for complete search history.

(56) References Cited

U.S. PATENT DOCUMENTS

| 3,348,414 | A | 10/1967 | Wilber et al. | |
| 9,777,590 | B2 | 10/2017 | Radeljak et al. | |
| 10,151,214 | B2 | 12/2018 | Rice et al. | |
| 10,683,771 | B2* | 6/2020 | Jausovec | F01D 17/08 |
| 2014/0013836 | A1* | 1/2014 | Stilin | F01D 5/282 |
| | | | | 73/112.01 |
| 2014/0182292 | A1 | 7/2014 | Hudon et al. | |
| 2018/0340444 | A1* | 11/2018 | Jausovec | F01D 9/041 |
| 2022/0356814 | A1 | 11/2022 | White, III et al. | |
| 2023/0193773 | A1 | 6/2023 | Clark et al. | |

FOREIGN PATENT DOCUMENTS

| EP | 3000979 A1 | 3/2016 | |
| GB | 2452026 A * | 2/2009 | G01F 1/46 |

OTHER PUBLICATIONS

Search Report issued in European Patent Application No. 24188669.6; Application Filing Date Jul. 15, 2024; Date of Mailing Dec. 2, 2024 (11 pages).

* cited by examiner

*Primary Examiner* — Dominick L Plakkoottam
*Assistant Examiner* — Paul W Thiede
(74) *Attorney, Agent, or Firm* — CANTOR COLBURN LLP (57) ABSTRACT

A stator cluster is provided and includes inner and outer stator walls, stator vanes radially interposed between the inner and outer stator walls and a stanchion body connected to and extending radially outwardly from the outer stator wall. At least the stator vanes, the outer stator wall and the stanchion body are formed to define internal paths.

15 Claims, 6 Drawing Sheets

INSTRUMENTED STATOR WITH EXTENDED INTERNAL PASSAGES

STATEMENT OF FEDERAL SUPPORT

This invention was made with Government support awarded by the United States. The Government has certain rights in this invention.

BACKGROUND

Exemplary embodiments of the present disclosure relate generally to gas turbine engines and, in one embodiment, to an instrumented stator with extended internal passages.

In a gas turbine engine, air is compressed in a compressor and compressor air is then mixed with fuel and combusted in a combustor to produce a high-temperature and high-pressure working fluid. This working fluid is directed into a turbine in which the working fluid is expanded to generate power. The generated power drives the rotation of a rotor within the turbine through aerodynamic interactions between the working fluid and turbine blades or airfoils. The rotor can be used to drive rotations of a propeller or to produce electricity in a generator.

A stator is a component of the gas turbine engine that remains stationary while the rotor rotates about a rotational axis relative to the stator. Currently, hypo tubes are installed and routed on individual stator clusters. Then, instrumented stator clusters are carefully installed on a mating case. Due to multiple hypo tubes rolled, a tube(s) or its joint can be broken or damaged during handling and assembling to its mating case enclosure.

Accordingly, a need exists for an improved instrumented stator cluster.

BRIEF DESCRIPTION

According to an aspect of the disclosure, a stator cluster is provided and includes inner and outer stator walls, stator vanes radially interposed between the inner and outer stator walls and a stanchion body connected to and extending radially outwardly from the outer stator wall. At least the stator vanes, the outer stator wall and the stanchion body are formed to define internal paths.

In accordance with additional or alternative embodiments, the inner and outer stator walls are curved, each of the stator vanes has an airfoil shape and the stator vanes are separated from one another by regular intervals.

In accordance with additional or alternative embodiments, the stanchion body has a racetrack shape and is formed to define a central passage which is wider than the internal paths.

In accordance with additional or alternative embodiments, each of the internal paths extends through the stanchion body and terminates at an outer surface of the stanchion body.

In accordance with additional or alternative embodiments, hypo tubes are pluggable into respective terminal ends of each of the internal paths at the outer surface of the stanchion body.

In accordance with additional or alternative embodiments, first and second portions of the internal paths are clustered at first and second opposite sides of the stanchion body.

In accordance with additional or alternative embodiments, sealant is disposed about an exterior of the stanchion body.

According to an aspect of the disclosure, a stator is provided and includes an outer case having an internal surface and multiple stator clusters arranged along the internal surface. Each of the multiple stator clusters includes inner and outer stator walls, stator vanes radially interposed between the inner and outer stator walls and a stanchion body connected to and extending radially outwardly from the outer stator wall and through the outer case. At least the stator vanes, the outer stator wall and the stanchion body are formed to define internal paths.

In accordance with additional or alternative embodiments, the outer case includes multiple bosses for correspondence with each of the multiple stator clusters and each of the multiple bosses is formed to define an opening through which the stanchion body of the corresponding one of the multiple stator clusters extends.

In accordance with additional or alternative embodiments, stator further includes sealant disposed between an exterior of the stanchion body for each of the multiple stator clusters and the corresponding one of the multiple bosses.

In accordance with additional or alternative embodiments, the outer case is formed to define one or more apertures for correspondence with each of the multiple stator clusters.

In accordance with additional or alternative embodiments, for each of the multiple stator clusters, the inner and outer stator walls are curved to conform to a curvature of the outer case, each of the stator vanes has an airfoil shape and the stator vanes are separated from one another by regular intervals.

In accordance with additional or alternative embodiments, for each of the multiple stator clusters, the stanchion body has a racetrack shape and the stanchion body is formed to define a central passage which is wider than the internal paths.

In accordance with additional or alternative embodiments, for each of the multiple stator clusters, each of the internal paths extends through the stanchion body and terminates at an outer surface of the stanchion body.

In accordance with additional or alternative embodiments, hypo tubes are pluggable into respective terminal ends of each of the internal paths at the outer surface of the stanchion body.

In accordance with additional or alternative embodiments, for each of the multiple stator clusters, first and second portions of the internal paths are clustered at first and second opposite sides of the stanchion body.

In accordance with additional or alternative embodiments, for each of the multiple stator clusters, the stanchion body has a circumferential length which is a substantial fraction of a circumferential length of the outer wall and the internal paths extend in a substantially straight path through the outer wall and the stanchion body.

According to an aspect of the disclosure, a method of assembling a stator is provided. The method includes assembling multiple stator clusters to each include inner and outer stator walls, stator vanes radially interposed between the inner and outer stator walls and a stanchion body connected to the outer stator wall, defining, for each of the multiple stator clusters, internal paths through at least the stator vanes, the outer stator wall and the stanchion body and arranging each of the multiple stator clusters along an internal surface of an outer case such that the stanchion body of each of the multiple stator clusters extends radially outwardly from the corresponding outer stator wall and through the outer case.

In accordance with additional or alternative embodiments, the assembling of each of the multiple stator clusters includes additive manufacturing.

In accordance with additional or alternative embodiments, for each of the multiple stator clusters, the internal paths terminate at an outer surface of the stanchion body and the method further includes plugging hypo tubes into respective terminal ends of each of the internal paths at the outer surface of the stanchion body following the arranging.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Figure 1:
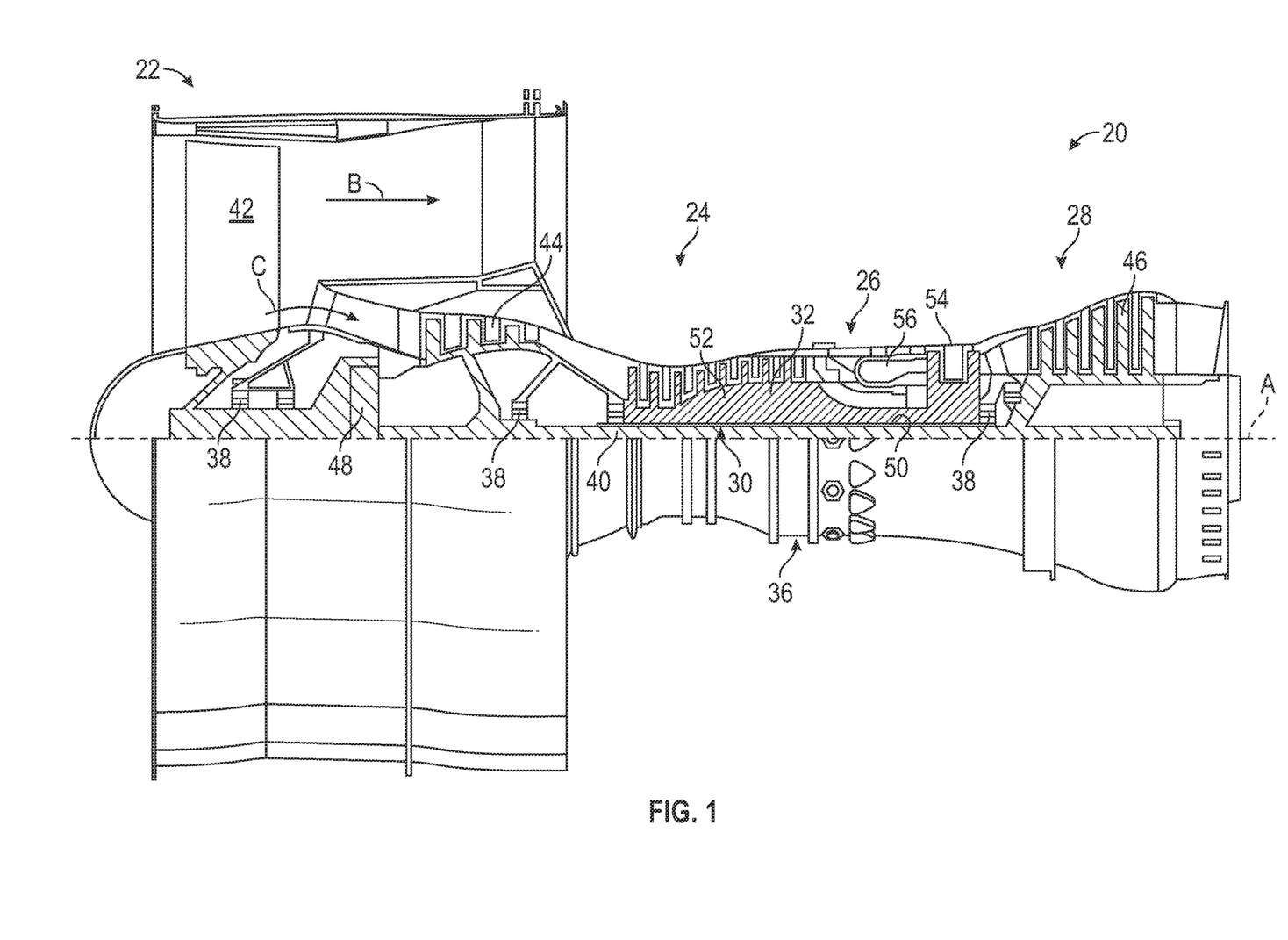
FIG. 1 is a partial cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include other systems or features. The fan section 22 drives air along a bypass flow path B in a bypass duct, while the compressor section 24 drives air along a core flow path C for compression and communication into the combustor section 26 and then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary gas turbine engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the gas turbine engine 20 between the high pressure compressor 52 and the high pressure turbine 54. The engine static structure 36 is arranged generally between the high pressure turbine 54 and the low pressure turbine 46. The engine static structure 36 further supports the bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 and then the high pressure compressor 52, is mixed and burned with fuel in the combustor 56 and is then expanded over the high pressure turbine 54 and the low pressure turbine 46. The high and low pressure turbines 54 and 46 rotationally drive the low speed spool 30 and the high speed spool 32, respectively, in response to the expansion. It will be appreciated that each of the positions of the fan section 22, compressor section 24, combustor section 26, turbine section 28, and fan drive gear system 48 may be varied. For example, geared architecture 48 may be located aft of the combustor section 26 or even aft of the turbine section 28, and the fan section 22 may be positioned forward or aft of the location of geared architecture 48.

As will be described below, instrumented stator clusters are provided with a stanchion body that extends through an outer case of a stator and with internal passages that extend through the stanchion body so that hypo tubes can be simply plugged and bonded to the internal passages. This will simplify the assembly procedure of measurement probes for the stator and avoid risks of damage to those hypo tubes associated with handling.

Figure 2:
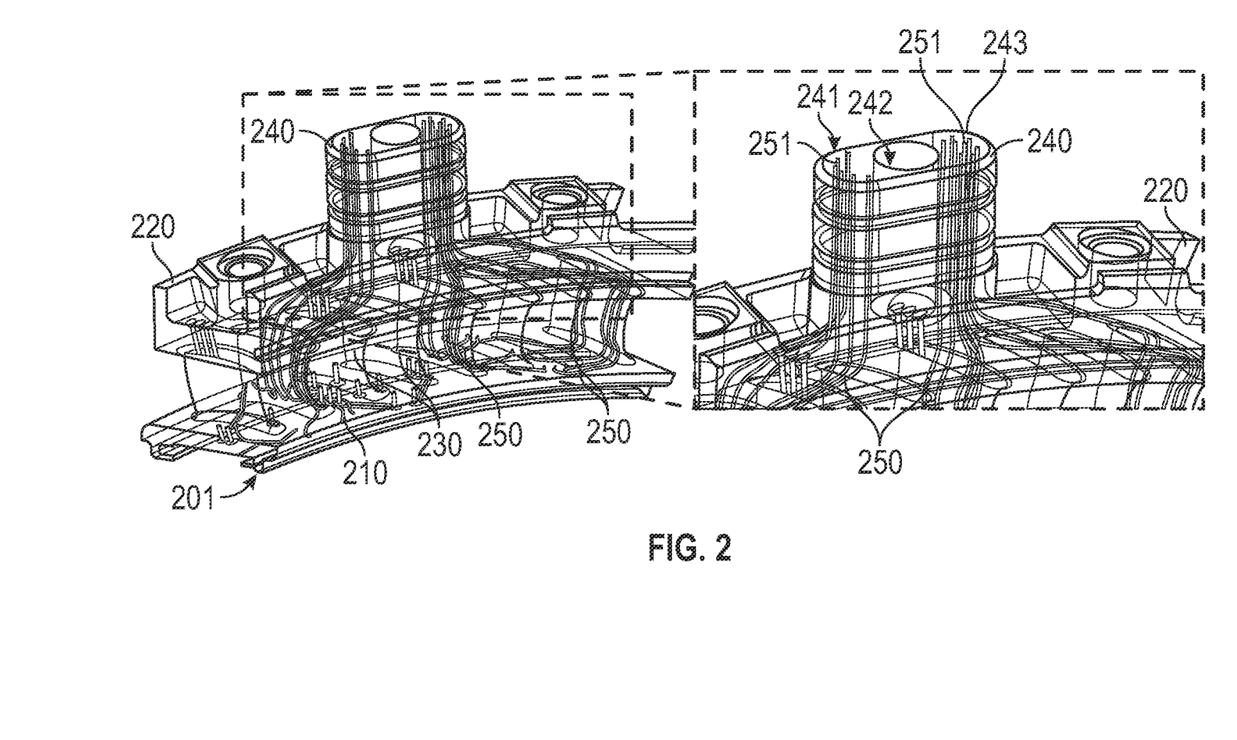
FIG. 2 is perspective view of a stator cluster in accordance with embodiments.

With continued reference to FIG. 1 and with additional reference to FIG. 2, a stator cluster 201 is provided for use with a stator of the gas turbine engine 20 of FIG. 1. As shown in FIG. 2, the stator cluster 201 includes an inner stator wall 210, an outer stator wall 220, stator vanes 230 radially interposed between the inner and outer stator walls 210 and 220 and a stanchion body 240. The inner and outer stator walls 210 and 220 can be curved to match a curvature of an outer case 310 (to be discussed below with reference to FIGS. 3 and 4). Each of the stator vanes 230 can have an airfoil shape and the stator vanes 230 can be separated from one another by regular intervals. The stanchion body 240 is connected to and extends radially outwardly from an external surface of the outer stator wall 220. At least the stator vanes 230, the outer stator wall 220 and the stanchion body 240 are formed to define internal paths 250 for various types of pressure measurement, temperature measurement, etc. In accordance with embodiments, the stanchion body 240 can have a racetrack shape 241 and can be formed to define a central passage 242 which is wider than each of the internal paths 250. Sealant 403 (to be discussed below with reference to FIG. 4) can be disposed about an exterior of the stanchion body 240.

Figure 4:
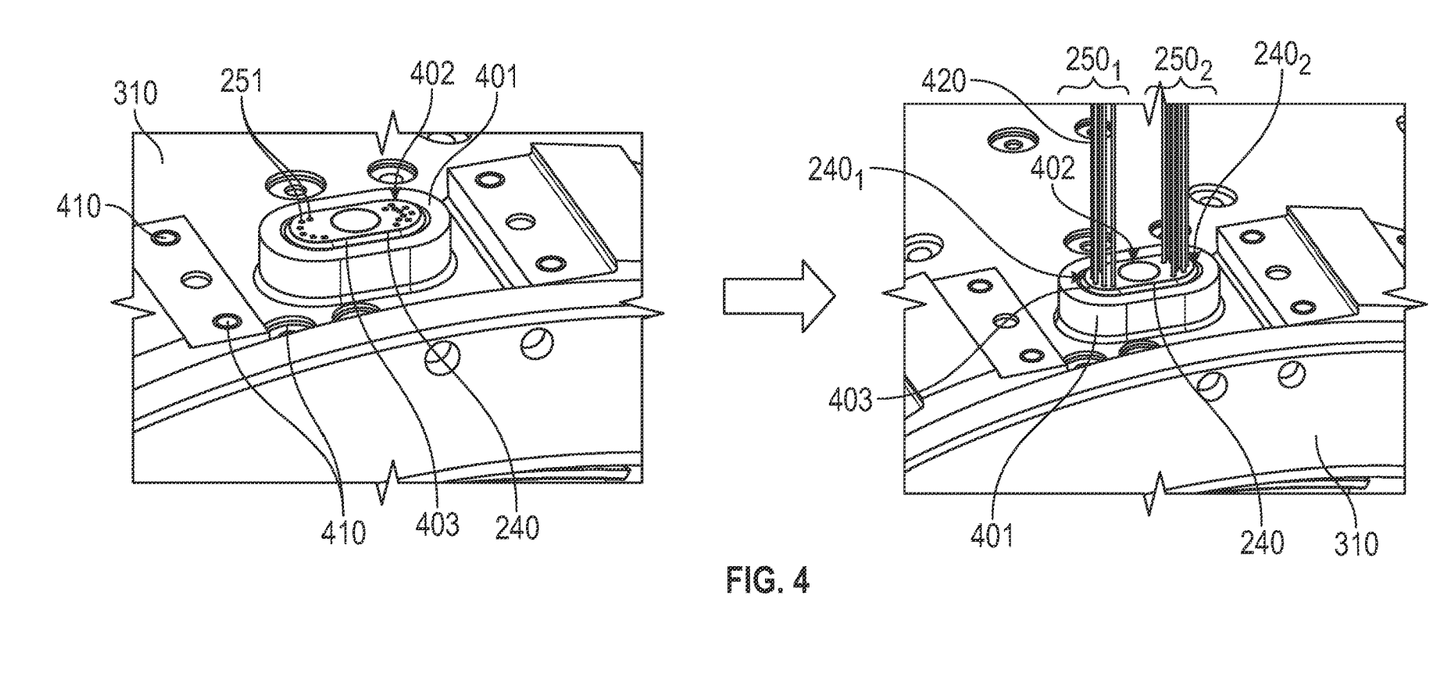
FIG. 4 are perspective views of hypo tubes being plugged into terminal ends of internal paths of a stator cluster in accordance with embodiments.

Each of the internal paths 250 extends through the stanchion body 240 and has a terminal end 251 that terminates at an outer surface 243 of the stanchion body 240. Hypo tubes 420 (to be discussed below with reference to FIG. 4)

are pluggable into the respective terminal end 251 of each of the internal paths 250 at the outer surface 243 of the stanchion body 240. This greatly simplifies the process of installing, plugging and bonding the hypo tubes to the internal paths 250. In accordance with embodiments, a first portion 2501 of the internal paths 250 can be clustered at a first side 2401 of the stanchion body 240 and a second portion 2502 of the internal paths 250 can be clustered at a second side 2402 of the stanchion body 240, which is opposite the first side 2401 of the stanchion body 240.

Figure 3:
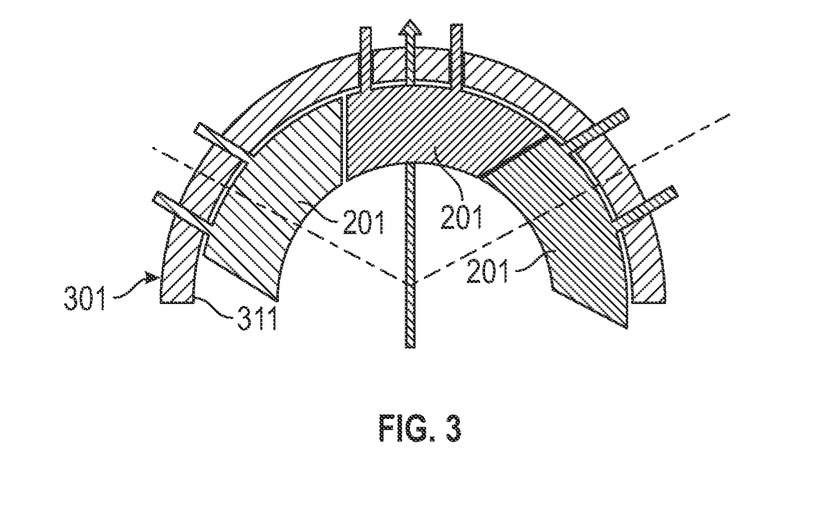
FIG. 3 is a schematic illustration of multiple stator clusters arranged circumferentially along an internal surface of an outer case in accordance with embodiments.

With reference to FIGS. 3 and 4, a stator 301 is provided and includes an outer case 310 having an internal surface 311 and multiple stator clusters 201. The outer case 310 can have a curvature with which respective curvatures of the inner and outer walls 210 and 220 conform. As such, the multiple stator clusters 201 can be arranged circumferentially along the internal surface 311. Each of the multiple stator clusters 201 includes the features described above and, for each of the multiple stator clusters, the stanchion body 240 is connected to and extends radially outwardly from the external surface of the outer stator wall 220 and through the outer case 310.

As shown in FIG. 4, the outer case 310 includes multiple bosses 401 for correspondence with each of the multiple stator clusters 201 and can be formed to define one or more apertures 410 for correspondence with each of the multiple stator clusters 201. Each of the multiple bosses 401 is formed to define an opening 402 through which the stanchion body 240 of the corresponding one of the multiple stator clusters 201 extends. The stator 301 can further include sealant 403. The sealant 403 can be disposed between an exterior of the stanchion body 240 for each of the multiple stator clusters 201 and an interior surface of the corresponding one of the multiple bosses 401.

For each of the multiple stator clusters 201 in the stator 301, hypo tubes 420 are pluggable into the respective terminal end 251 of each of the internal paths 250 at the outer surface 243 of the stanchion body 240. The hypo tubes 420 can be used to support various types of pressure measurement, temperature measurement, etc., though they are relatively small and fragile. Whereas the conventional plugging in of hypo tubes is often a point at which hypo tubes are damaged or broked, the plugging in of the hypo tubes 420 to the respective terminal end 251 of each of the internal paths 250 can occur following the circumferential arrangement of the multiple stator clusters 201 along the internal surface 311. This is a significantly simpler and easier process than what was possible before and decreases the risk of damage and breakage of the hypo tubes 420.

Figure 5:
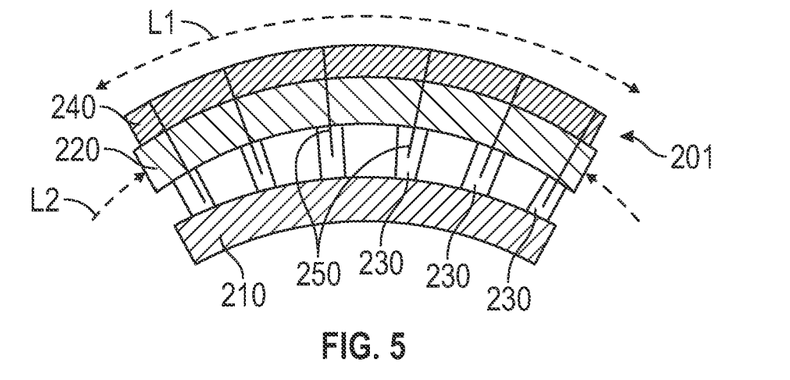
FIG. 5 is a schematic view of a stator cluster with a stanchion body that has a circumferential length that is a substantial fraction of a circumferential length of an outer wall in accordance with embodiments.

With reference to FIG. 5 and in accordance with embodiments, for each of the multiple stator clusters 201, the stanchion body 240 has a circumferential length L1 which is a substantial fraction of a circumferential length L2 of the outer wall 220. In these or other cases, all or a substantial number of the internal paths 250 can extend radially outwardly in a substantially straight path through at least the outer wall 220 and the stanchion body 240.

Figure 6:
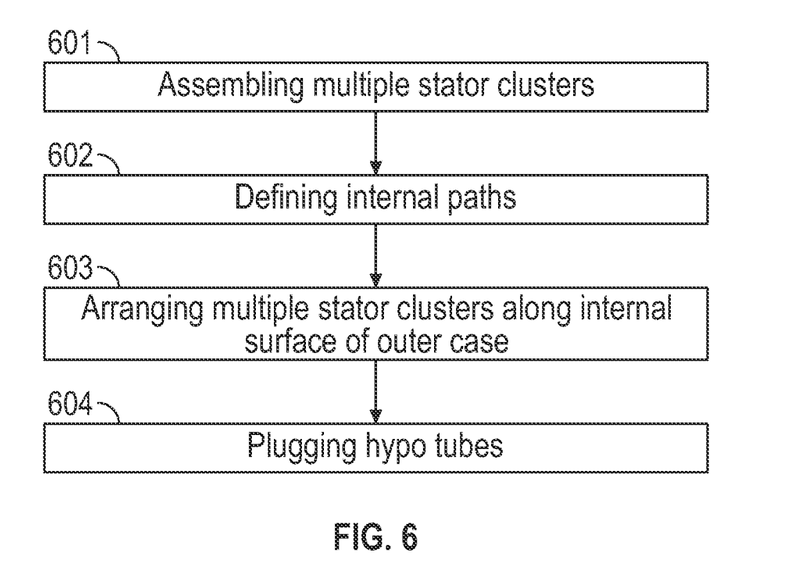
FIG. 6 is a flow diagram illustrating a method of assembling a stator in accordance with embodiments.
Figure 7:
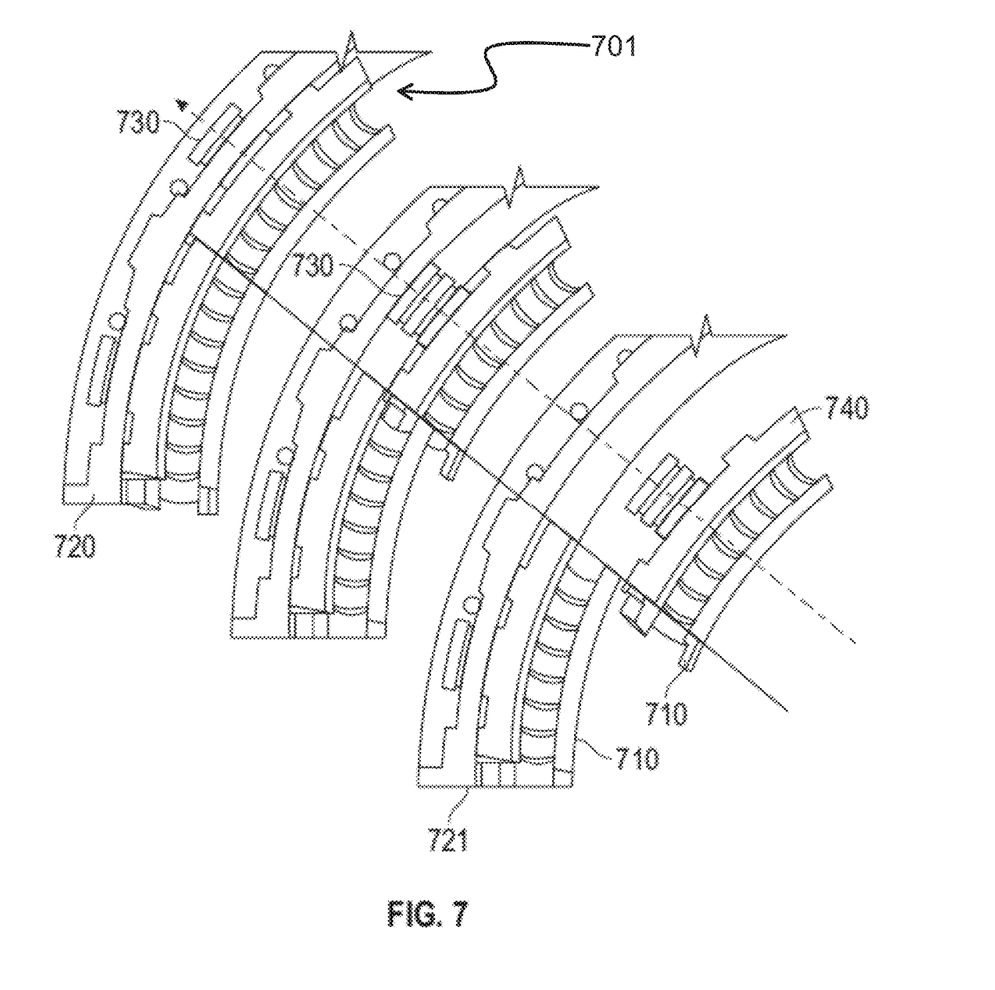
FIG. 7 is a schematic illustration of the method of FIG. 7 in accordance with embodiments.

With reference to FIGS. 6 and 7, a method of assembling a stator 701 is provided. The method includes assembling multiple stator clusters 710 to each include the features generally described above by, e.g., additive manufacturing or another suitable manufacturing process (block 601), defining, for each of the multiple stator clusters 710, internal paths through at least the stator vanes, the outer stator wall and the stanchion body (block 602) and arranging each of the multiple stator clusters 710 along an internal surface 721 of an outer case 720 such that the stanchion body 730 of each of the multiple stator clusters 710 extends radially outwardly from the corresponding outer stator wall 740 and through the outer case 720 (block 603). As described above, for each of the multiple stator clusters 710, the internal paths terminate at an outer surface of the stanchion body 730 and the method further includes plugging hypo tubes (see FIG. 4) into respective terminal ends of each of the internal paths at the outer surface of the stanchion body following the arranging (block 604).

Benefits of the features described herein are the provision of instrumented stator clusters in which hypo tubes are routed after the instrumented stator clusters are assembled. This avoids risks of the hypo tubes being broken or damaged during assembly and handling.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:
1. A stator cluster, comprising:
   inner and outer stator walls;
   stator vanes radially interposed between the inner and outer stator walls; and
   a stanchion body connected to and extending radially outwardly from the outer stator wall,
   at least the stator vanes, the outer stator wall and the stanchion body being formed to define internal paths,
   wherein:
   each of the internal paths extends through the stanchion body and terminates at an outer surface of the stanchion body,
   the stator cluster further comprises hypo tubes which are pluggable into respective terminal ends of each of the internal paths at the outer surface of the stanchion body, and
   each hypo tube has a constant width corresponding to a width of the one of the internal paths into which the hypo tube is plugged.

2. A stator cluster, comprising:
inner and outer stator walls;
stator vanes radially interposed between the inner and outer stator walls; and
a stanchion body connected to and extending radially outwardly from the outer stator wall,
at least the stator vanes, the outer stator wall and the stanchion body being formed to define internal paths,
wherein the stator cluster further comprises sealant disposed about an exterior of the stanchion body.

3. A stator, comprising:
an outer case having an internal surface; and
multiple stator clusters arranged along the internal surface, each of the multiple stator clusters comprising:
inner and outer stator walls;
stator vanes radially interposed between the inner and outer stator walls; and
a stanchion body connected to and extending radially outwardly from the outer stator wall and through the outer case,
at least the stator vanes, the outer stator wall and the stanchion body being formed to define internal paths.

4. The stator according to claim 3, wherein:
the outer case comprises multiple bosses for correspondence with each of the multiple stator clusters, and
each of the multiple bosses is formed to define an opening through which the stanchion body of the corresponding one of the multiple stator clusters extends.

5. The stator according to claim 4, wherein the stator further comprises sealant disposed between an exterior of the stanchion body for each of the multiple stator clusters and the corresponding one of the multiple bosses.

6. The stator according to claim 3, wherein the outer case is formed to define one or more apertures for correspondence with each of the multiple stator clusters.

7. The stator according to claim 3, wherein for each of the multiple stator clusters:
the inner and outer stator walls are curved to conform to a curvature of the outer case,
each of the stator vanes has an airfoil shape, and
the stator vanes are separated from one another by regular intervals.

8. The stator according to claim 3, wherein, for each of the multiple stator clusters, the stanchion body is formed to define a central passage which is wider than the internal paths.

9. The stator according to claim 3, wherein, for each of the multiple stator clusters, each of the internal paths extends through the stanchion body and terminates at an outer surface of the stanchion body.

10. The stator according to claim 9, further comprising hypo tubes which are pluggable into respective terminal ends of each of the internal paths at the outer surface of the stanchion body.

11. The stator according to claim 3, wherein, for each of the multiple stator clusters, first and second portions of the internal paths are clustered at first and second opposite sides of the stanchion body.

12. The stator according to claim 3, wherein, for each of the multiple stator clusters:
the stanchion body has a circumferential length which is a substantial fraction of a circumferential length of the outer wall, and
the internal paths extend in a substantially straight path through the outer wall and the stanchion body.

13. A method of assembling a stator, the method comprising:
assembling multiple stator clusters to each comprise inner and outer stator walls, stator vanes radially interposed between the inner and outer stator walls and a stanchion body connected to the outer stator wall;
defining, for each of the multiple stator clusters, internal paths through at least the stator vanes, the outer stator wall and the stanchion body; and
arranging each of the multiple stator clusters along an internal surface of an outer case such that the stanchion body of each of the multiple stator clusters extends radially outwardly from the corresponding outer stator wall and through the outer case.

14. The method according to claim 13, wherein the assembling of each of the multiple stator clusters comprises additive manufacturing.

15. The method according to claim 13, wherein:
for each of the multiple stator clusters, the internal paths terminate at an outer surface of the stanchion body, and
the method further comprises plugging hypo tubes into respective terminal ends of each of the internal paths at the outer surface of the stanchion body following the arranging.

* * * * *